C. W. ANDERSON.
CLUTCH PEDAL RETAINING DEVICE.
APPLICATION FILED OCT. 4, 1917.
1,281,891.
Patented Oct. 15, 1918.
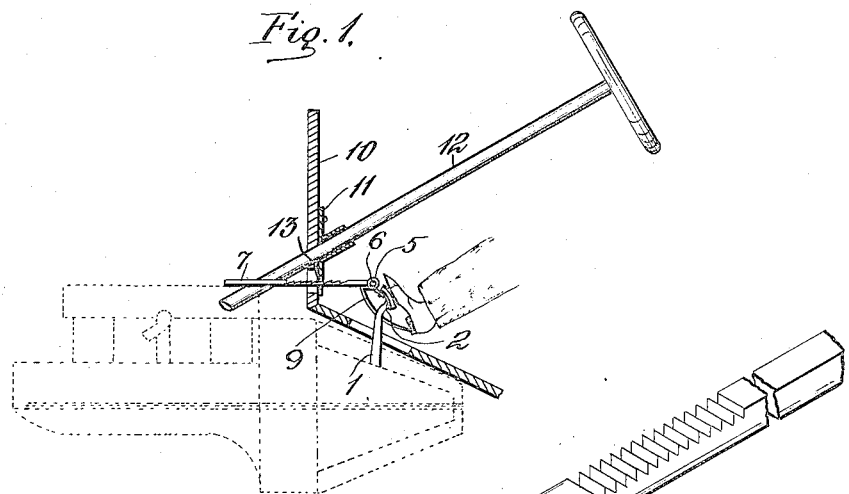
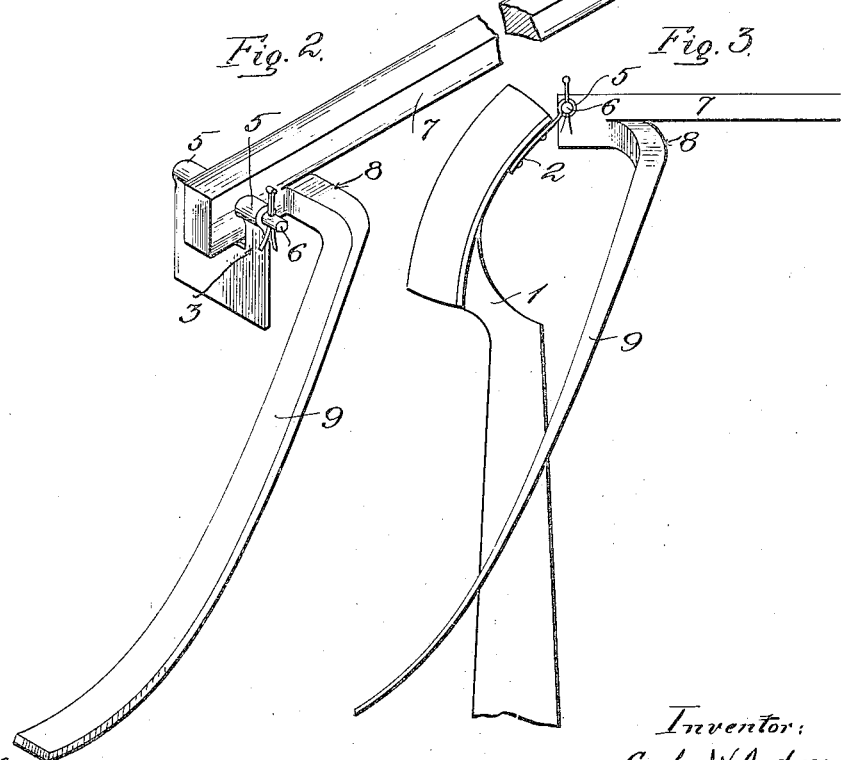
Inventor:
Carlos W. Anderson

UNITED STATES PATENT OFFICE.

CARLOS W. ANDERSON, OF LONG BEACH, CALIFORNIA.

CLUTCH-PEDAL-RETAINING DEVICE.

1,281,891.  Specification of Letters Patent.  Patented Oct. 15, 1918.

Application filed October 4, 1917. Serial No. 196,945.

*To all whom it may concern:*

Be it known that I, CARLOS W. ANDERSON, a citizen of the United States, residing at Long Beach, county of Los Angeles, and State of California, have invented a certain new and useful Clutch-Pedal-Retaining Device, of which the following is a specification.

This invention relates to a means for holding the clutch pedal of a planetary transmission mechanism of automobiles in operative position, and it has especial reference to an attachment for pedals employed in connecting the engine shaft with a low and high speed gear, one of the objects of this invention being to provide a simple, cheap and easily attachable and detachable device whereby the low speed position of the clutch pedal may be maintained mechanically, thereby relieving the operator of the machine of the strain and exertion incident on a continued pressure required to hold the pedal in low gear, which is oftentimes necessary when negotiating grades and sandy roads.

A further object of this invention is to provide a simple pedal attachment in which the operation thereof may be effected by slight pressure from the same foot which is used to operate the pedal and which requires for attachment no interference with the assembled parts of the machine.

Other objects will appear from the subjoined specification in connection with the accompanying drawing, representing a preferred form of my invention, and in which, Figure 1 is a sectional view showing the invention as applied.

Fig. 2 is an enlarged perspective view showing the rack and its operating lever, and the plate for pivoting same, and Fig. 3 is an enlarged fragmentary side view.

Especially referring to the drawing 1 designates the clutch pedal of a well known planetary type of transmission used both for high and low speeds, and movable by foot pressure to engage the low speed transmitting element.

Onto the rear of the pedal 1 is riveted or otherwise secured a plate 2, formed with a bifurcation 3, the tines of which are bent upon themselves to form tubular bearings 5 for a pin 6, which passes through and constitutes a pivot for a rack bar 7.

Integral with said rack bar 7 is a portion 8 extending outwardly approximately at right angles to the longitudinal axis of the bar 7, and terminating in a downwardly extending lever 9, laterally disposed of the pedal 1 and in convenient proximity to the heel or other portion of the foot of the operator.

On the dash board 10 of the machine is fixed a plate 11, which may be the usual guide for the steering rod 12, provided with an opening 13 through which is extended the rack bar 7, and with the inside edge of which opening the teeth of the rack bar engage to hold the pedal 1 in moved position. Normally the rack bar lies on the bottom of the opening 13 by gravity, and when a prolonged maintenance of the pedal in foremost position is necessitated by the condition of the roads, the operator, by slight side movement of his foot, engages the lever 9, and tilting the rack bar 7, about its pivot 6, brings the teeth thereof into engagement with the inside edge of the opening 13, such engagement being insured by the spring provided to hold the clutch pedal in high gear.

To release the rack bar 7 from engagement with the opening, but a slight push on the pedal is necessary, whereupon the bar drops by gravity out of engagement.

What I claim, is:—

A device for retaining the clutch pedal of an automobile in operative position, comprising a horizontal dentate bar, means for pivotally attaching same to the pedal, means for engagement by said bar to hold the pedal in operative position, and means to throw said bar in engagement with said holding means, comprising a member integral with said bar and extending outwardly and then downwardly relatively thereto and in proximity to the heel of the operator.

In witness whereof I have set my hand in the presence of two witnesses.

CARLOS W. ANDERSON.

Witnesses:
HENRY E. STORRS,
ANTON GLOETZNER, Jr.